March 11, 1969  T. J. HARRIS ET AL  3,432,221
STRESSED LASER SCANNING DEVICE USING LIGHT POLARIZERS
Filed Aug. 5, 1964

INVENTORS
THOMAS J. HARRIS
ERHARD MAX
BY Charles P. Boberg
ATTORNEY

United States Patent Office 3,432,221
Patented Mar. 11, 1969

3,432,221
STRESSED LASER SCANNING DEVICE USING LIGHT POLARIZERS
Thomas J. Harris, Poughkeepsie, and Erhard Max, Wappinger Falls, N.Y., assignors to International Business Machines Corporation, New York, N.Y., a corporation of New York
Filed Aug. 5, 1964, Ser. No. 387,728
U.S. Cl. 350—149                    11 Claims
Int. Cl. G02f 1/24, 1/26, 1/28

ABSTRACT OF THE DISCLOSURE

A continuously scanning laser beam is produced by excitatory forces which are applied only to the active laser medium itself. In particular, the laser construction is arranged so that the active medium is rendered sensitive to the polarization angle of its own generated light by interposing a polarized light analyzing means between the active laser medium and at least one of its associated mirrors. The active medium, which is either normally or potentially birefringent, is subjected to a stress wave that is propagated through it at a rate commensurate with the desired scanning speed. Lasing action occurs only in the filamentary portion of the medium which at that instant is being suitably stressed by the applied wave to generate light having a polarization consistent with that of the analyzing means, the position of this filamentary portion shifting with the progress of the wave through the medium.

---

This invention relates to optical scanning devices of the type in which scanning is performed by a laser beam.

Various ways of scanning with a laser beam have been proposed. Customarily the scanning excitation is applied to an element that is associated with but separate from the active medium which generates the laser beam, or if applied to the laser medium itself, the scanning excitation has not been of a kind which would be conducive to the production of a high-resolution scanning beam. As far as is known, no prior attempt has been made to utilize the enherent stress optical properties of a birefringent laser medium to perform the scanning function.

It is an object of the present invention to produce a scanning laser beam by applying a combined beam inducing and scanning excitation directly to an active laser medium which has been rendered sensitive to the polarization angle of its own generated light.

Another object is to produce a very high-resolution lasing action which is confined to an extremely narrow filament within the body of the laser medium, the position of this filament being varied in response to a scanning excitation.

Still another object is to control the positioning of the lasing filament within the laser medium in such a manner as to accomplish two-dimensional scanning.

The foregoing objects are achieved in a preferred form of the invention by propagating one or more ultrasonic waves through an active laser medium (such as a ruby crystal) to change the birefringent properties or said medium along the moving stress line produced by such a wave. Because of certain novel features incorporated in the laser construction, including polarized light analyzing means interposed between the active medium and its associated light reflecting means, lasing action can take place only within a narrow filament of the active medium wherein the birefringent properties are being selectively altered by the deformation stress of the ultrasonic wave. The laser beam thus generated will scan at a rate determined by the speed at which sound travels through the medium. Several advantages are derived from this type of operation. Thus, the same medium which generates the laser beam also is instrumental in producing the scanning action, so that a separate scan-producing medium is not required. No birefringent material other than the active medium of the laser itself need be employed. Conservation of the inverted population energy in the laser results from the fact that the lasing action occurs only in a narrow filament of the medium. Control of the scanning action is achieved with a relatively small expenditure of power.

The foregoing and other objects, features and advantages of the invention will be apparent from the following more particular description of several embodiments of the invention, as illustrated in the accompanying drawings.

Figure 1:
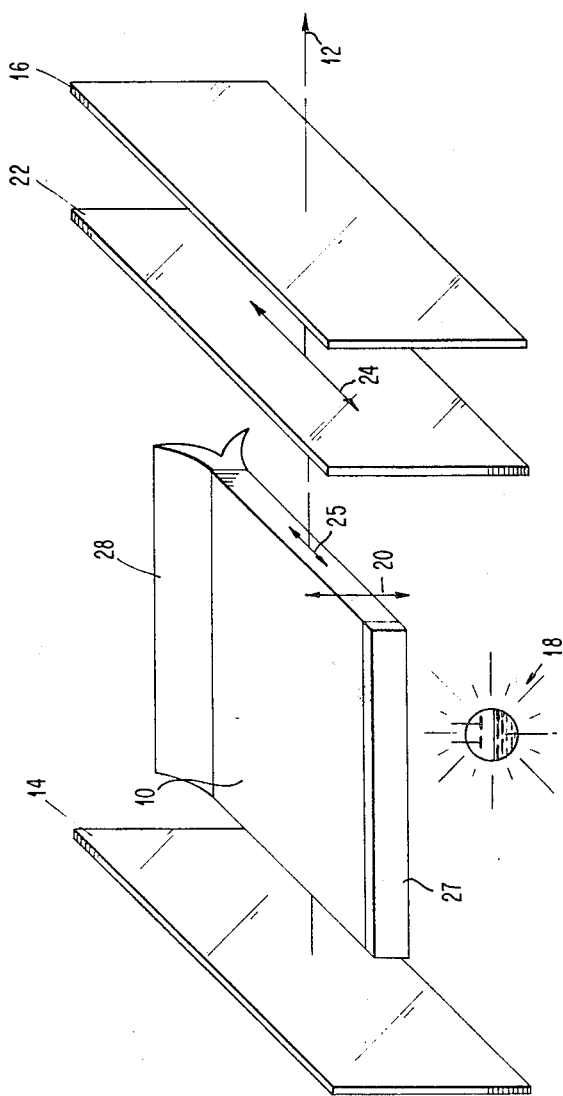
Figure 2:
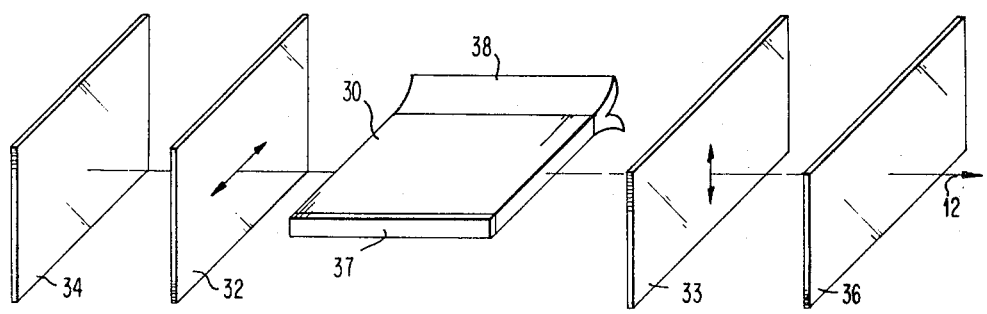
Figure 3:
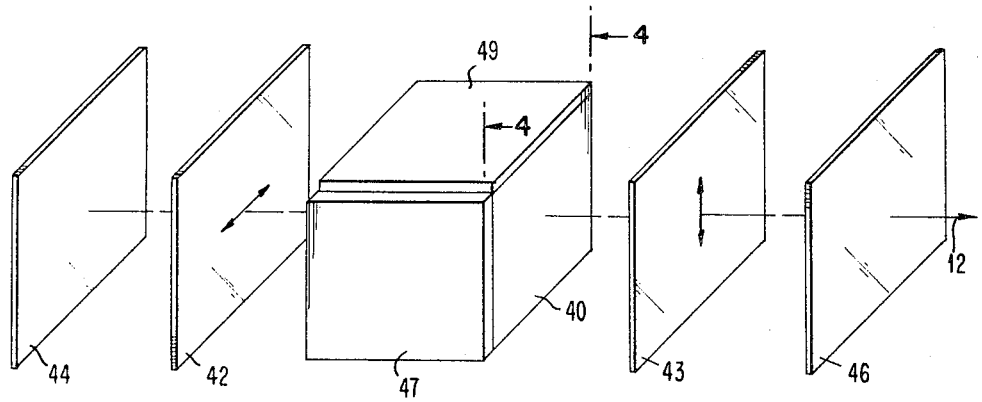
Figure 4:
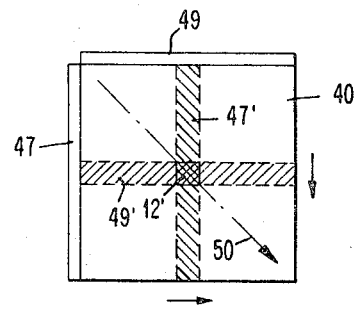
Figure 5:
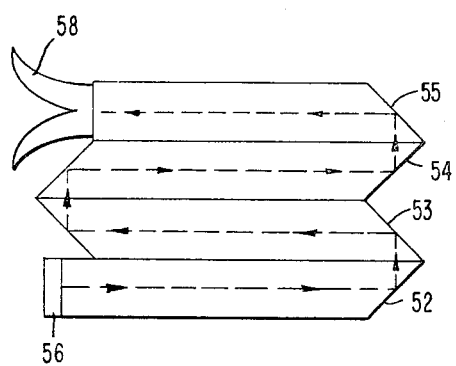

In the drawings:
FIGS. 1, 2 and 3 are exploded perspective views of three illustrative embodiments of the invention, FIGS. 1 and 2 respectively showing two types of one dimensional scanning and FIG. 3 showing one form of a two-dimensional scanner.
FIG. 4 is a cross section through the assemblage of FIG. 3, taken on the line 4—4 in FIG. 3, showing an end view of the laser crystal and certain of its associated elements.
FIG. 5 is an end view of another laser crystal assemblage designed to achieve two-dimensional scanning in accordance with still another embodiment of the invention.

In carrying out the principle of the invention, a laser is arranged so that at least one dimension of its active medium (such as a ruby crystal) corresponds to a linear path that is to be scanned by the laser beam. The medium is conditioned to operate in such a manner that, at any given instant, lasing action can take place only within a narrow filament of this material, the position of such filament continually changing at a given rate through the body of the material. The same excitation which generates the filamentary laser beam also produces the desired scanning action of this beam.

When reference is made herein to a "laser medium" or to the "active medium" of a laser, such expression is intended to denote a type of material wherein the atoms are in a state of inverted population. This condition sometimes is referred to as a "negative absorption" or "negative temperature" state; however, these latter expressions will not be used hereinafter.

As mentioned above, the invention operates in such a manner that a single excitation is effective to stimulate lasing action in the active medium of a laser and also to move the generated laser beam along the desired scanning path. FIG. 1 illustrates one way in which this result is accomplished. In this figure, which is an exploded perspective view of the actual construction, the active medium of the laser is a flat ruby crystal 10 having a width (measured between its front and back edges as viewed in FIG. 1) substantially equal to the length of the scanning path along which the generated laser beam 12 is to travel. The crystal is positioned between two plane mirrors 14 and 16 which extend parallel to the left and right edges of the crystal 10, as viewed in FIG. 1, in the direction of the beam scanning path. In accordance with known practice, the mirror 14 is fully reflective, but the mirror 16 is only partially reflecting so that it both reflects and transmits light. These mirrors actually are placed much closer to the crystal 10 than is indicated in FIG. 1. In operation, the ruby crystal 10 is illuminated by a suitable source of pumping light, such as an arc lamp 18. The mirrors 14 and 16, in conjunction with the crystal 10, constitute a laser cavity. Light emission would be stimulated simultaneously across the entire width of the crystal 10 if some means were not provided for confining this emission at any given instant to a selected narrow filament within the body of the crystal 10. Such means now will be described:

In the embodiment of FIG. 1 two measures are taken to produce a selective lasing action within the cavity. First, the ruby crystal 10 is cut at a particular angle with respect to its optical axis so that any stimulated light wave of a given frequency which traverses the length of the crystal 10 ordinarily will emerge with a preferred vertical polarization, as indicated by the arrow 20 in FIG. 1, due to the normal birefringent properties of this crystal. Stating this another way, the ruby crystal 10 in this instance is cut so that it has a preferred vertical direction of oscillation for the light waves stimulated therein. Secondly, the laser cavity in general is prevented from resonating while the emitted light is in its normal, vertically polarized condition by interposng a polarizer or analyzer 22 between the crystal 10 and one of the mirrors such as 16. The analyzer 22 will transmit only light which is horizontally polarized, as indicated by the arrow 24 in FIG. 1. The vertically polarized light (indicated by arrow 20), which normally is emitted by the crystal 10, cannot pass through the analyzer 22 and consequently does not reach the mirror 16. Hence, reflection of such light back and forth between the mirrors 16 and 14 through the body of the crystal 10 is prevented, so that lasing action cannot occur within that portion of the laser cavity which is in its normal state. In other words, the cavity normally is detuned and must be specifically conditioned for lasing action in the desired region thereof.

In order that lasing action may occur, the light which is emitted from the right end of the ruby crystal 10 (in the direction of the mirror 16) must be horizontally rather than vertically polarized, so that it can pass the analyzer 22 positioned between the crystal 10 and this mirror. This change of polarization is accomplished by selectively altering the birefringent properties of the medium in a particular filament of the crystal 10, thereby changing the phase relationship of the light rays passing through this portion of the crystal. The change in phase is sufficient to rotate the resultant polarization by 90°, so that now the beam of light emitted from the right end of the crystal 10 (as viewed in FIG. 1) is horizontally rather than vertically polarized, as indicated by the arrow 25. A horizontally polarized beam will pass through the analyzer 22 and be partially reflected back toward the crystal 10 by the partially reflecting mirror 16. The portion of the beam reflected by the mirror 16, being still horizontally polarized, will pass back through the analyzer 22 and reenter the crystal 10. The rentering light is doubly refracted again during its passage through the crystal 10 toward the mirror 14, and still again during its subsequent passage through the crystal 10 after being reflected by the mirror 14. Assuming that the specific filamentary portion of the crystal 10 through which this reflected light passes is still being maintained in its altered birefringent state, the light rays again will assume that phase relationship which causes the resultant beam emitted from the right end of the crystal 10 to be horizontally polarized, as indicated by the arrow 25 in FIG. 1, thereby insuring the passage of this beam through the analyzer 22 so that it can be partially reflected back by the mirror 16. Repetition of this process many times will stimulate the release of inverted population energy within the crystal 10 to induce a lasing action in the well-known manner so as to produce a powerful beam of coherent monochromatic light 12 which is transmitted by the semitransparent mirror 16, as indicated in FIG. 1.

In order that a useful scanning operation may be performed with the laser beam 12, it is desirable, of course, that the width of this beam be small compared to the width of the crystal 10. Furthermore, the position of the beam 12 should be changed uniformly at a rate which will permit the desired filamentary lasing action to occur while the beam is being shifted. These requirements are met, in accordance with the principle of the invention, by utilizing an ultrasonic wave to alter the birefringent properties of the ruby crystal 10 within a selected filamentary portion of this medium, so that lasing action within the cavity at any given instant is confined to that portion of the medium wherein the ultrasonic wave is exerting its maximum stress upon the medium. Thus as shown in FIG. 1, an ultrasonic wave generator such as a piezoelectric transducer 27 is positional against one of the longitudinal edges of the crystal 10. The deformation wave generated by the transducer 26 passes through the crystal 10 at the speed of sound transversely to the direction in which the laser beam 12 is to be propagated. Upon reaching the opposite edge of the crystal 10, this ultrasonic wave is absorbed by a suitable wave absorber 28 positioned adjacent to that edge of the crystal 10. The width of the crystal 10 does not exceed the wave length of the ultrasonic wave; hence, at any given instant there will be one, and only one, line through the crystal 10 along which the material is being subjected to the deformation stress of this wave, the remainder of the crystal 10 being substantially free of such stress at that time. A ruby crystal is sensitive to stress, so that the birefringent properties of the crystal 10 are altered whenever the intensity of the ultrasonic wave is at or near its maximum. The crystal is suitably cut and dimensioned so that, as a rule, any monochromatic light of a given frequency which traverses the length of this crystal (from left to right as viewed in FIG. 1) normally emerges therefrom with a substantially vertical polarization, as indicated by the arrow 20 in FIG. 1, but from the filamentary portion of the crystal which is being stressed by the ultrasonic wave, the light will emerge with a substantially horizontal polarization as indicated by the arrow 25 in FIG. 1. The speed of the ultrasonic wave is slow enough compared to the speed of light so that lasing action can occur within that portion of the medium which is being stressed by this wave as it progresses through the crystal 10.

To recapitulate, the ruby crystal 10 shown in FIG. 1 normally functions to emit light from its right-hand edge having a polarity such that it cannot pass the analyzer 22. However, when subjected to stress by an ultrasonic wave generated by the transducer 27, the birefringent properties of the crystal 10 are altered along the line of maximum stress so that light emitted by this narrow filament of the crystalline material is specially polarized to pass the analyzer 22, and under this condition the light emitted by the ruby crystal 10 is able to pass back and forth between the mirrors 14 and 16 through the body of the crystal 10, thereby stimulating the emission of a coherent, high-energy light beam 12 commonly referred to as a laser beam. As the ultrasonic wave progresses through the crystal, beam 12 sweeps horizontally (that is, from front to back as viewed in FIG. 1) in synchronism with the passage of the ultrasonic wave through the medium, disappearing when this wave becomes absorbed by the wave absorber 28. A new laser beam will be generated when the next cycle of the ultrasonic wave is manifested in the crystal 10.

To fulfill the purpose of this invention, it is not necessary that the ruby crystal be cut at a certain angle with respect to its optical axis so as to have a preferred direction of oscillation; or to state this another way, it is not necessary that the crystal be normally birefringent to the light which passes lengthwise through it. FIG. 2 schematically shows an embodiment of the invention wherein a ruby crystal is cut with its optical axis extending lengthwise through the crystal (that is, from left to right as viewed in FIG. 2) so that normally the crystal is not birefringent with respect to light traveling in that direction. Under these conditions, the crystal does not have a preferred direction of oscillation, and the light emitted from each of the right-hand and left-hand edges of the crystal 30, as viewed in FIG. 2, may be polarized in both horizontal and vertical directions. By utilizing a pair of analyzers 32 and 33, one being horizontally polarized and the other vertically polarized as shown, it is possible to produce a filamentary lasing action within the crystal 30 in the desired manner. Analyzer 32 is positioned between crystal 30 and the mirror 34, while analyzer 33 is positioned between crystal 30 and mirror 36. Normally the state of the crystal 30 is such that incident light which is vertically polarized will be transmitted along the optical axis as vertically polarized light, while incident light which is horizontally polarized will be transmitted along the optical axis as horizontally polarized light. Thus, any horizontally polarized light which is emitted by the crystal 30 in its normal state may pass through the horizontal analyzer 32 and be reflected by the mirror 34, but such light cannot pass through the vertical analyzer 33 and consequently cannot be reflected by the mirror 36. (The mirror 36 in FIG. 2 corresponds to the semi-transmissive mirror 16 in FIG. 1.) Any vertically polarized light which is emitted by the crystal 30 in its normal state can pass through the vertical analyzer 33 and be partially reflected by the mirror 36, but such light cannot pass through the horizontal analyzer 32 and be reflected by the mirror 34. Therefore, in the normal state of the crystal 30, any light which is emitted by this crystal, whether it be horizontally or vertically polarized or a combination of both, is prevented from making repeated traversals of the crystal 30 to stimulate any appreciable emission of light, due to the mutually perpendicular polarities of the analyzers 32 and 33.

By subjecting the crystal 30 to a certain stress, birefringence can be induced therein so that light of a given frequency which is vertically polarized upon entering one end of the crystal 30 is horizontally polarized when it is emitted from the opposite end thereof, and vice versa. Where this special condition exists within the crystal 30, monochromatic light of a given frequency emitted by the crystal and having, for example, a horizontal polarity can pass through the horizontal analyzer 32 and be reflected by the mirror 34, then undergo a 90° shift of polarity while passing back through the crystal 30 so that it now emerges as vertically polarized light, which thereupon will pass the vertical analyzer 33 and be partially reflected back by the mirror 36. A converse action then takes place whereby the vertically polarized light entering the crystal 30 through the vertical analyzer 33 has its polarity shifted 90° during its passage through the crystal 30, whereby it emerges as horizontally polarized light which will be passed by the horizontal analyzer 32 and be reflected back by the mirror 34. Thus, it will be seen that in the localized region where the crystal 30 has been conditioned to produce a 90° shift in the polarization of any light of a given frequency traversing its length, successive reflections of the light back and forth through the crystal 30 by the mirrors 34 and 36 can take place, thereby setting up a lasing action which ultimately produces the desired laser beam 12, just as in the embodiment of FIG. 1. It will be understood, of course, that a suitable pumping light source, not shown in FIG. 2, must be used.

To produce the desired local stressing of the crystalline medium 30, FIG. 2, so that lasing action will occur therein, an ultrasonic wave generated by a transducer 37 is sent through this crystal in a direction transverse to the direction in which the generated laser beam 12 will extend. As in the case of the embodiment shown in FIG. 1, lasing will occur only in the filamentary line of material which is being subjected to maximum stress by this ultrasonic wave, and the position of this line changes as said wave progresses across the crystal 30 and is eventually absorbed by the wave absorber 38. The laser beam 12 scans the desired path in synchronism with the passage of the ultrasonic wave in each scanning cycle.

FIGS. 3 and 4 schematically illustrate a device for accomplishing two-dimensional scanning in accordance with the principles of the invention. A ruby crystal 40 having a rectangular cross section corresponding to the area to be scanned is positioned between horizontal and vertical analyzers 42 and 43, respectively. The horizontal analyzer 42 is interposed between the crystal 40 and a fully reflective plane mirror 44, while the vertical analyzer 43 is interposed between the crystal 40 and a partially transmissive plane mirror 46. In its normal state the crystal 40 is not birefringent. As in the case of the embodiment shown in FIG. 2, lasing action normally cannot take place within the crystal 40, FIG. 3, due to the mutually exclusive polarities of the horizontal and vertical analyzers 42 and 43. However, under a special condition of birefringence which is induced by suitably stressing the medium 40, lasing action can occur in the portion of the material which is being subjected to this stress due to the 90° shift in the direction of polarization of the stimulated monochromatic light as it passes through the stressed region. This has been fully explained above in connection with FIG. 2. Where two-dimensional scanning is desired, two ultrasonic wave generators 47 and 49 are employed as shown in FIG. 3, the generator 47 being effective to propagate an ultrasonic wave horizontally through the medium 40, while the generator 49 will propagate an ultrasonic wave vertically through the medium 40. (For convenience the associated wave absorbers and pumping light source are omitted from this showing.) The deformation effects of the two ultrasonic waves are represented diagramatically by the shaded areas 47' and 49', respectively, in FIG. 4. These two bands of maximum stress are assumed to be moving through the medium 40 in directions at right angles to each other. The respective intensities of the horizontally and vertically moving ultrasonic waves are selected so that the total effect necessary to produce lasing action is attained only at the intersection of these two deformation waves. This is indicated in FIG. 4 by the small, cross-hatched area 12' at the junction of the two shaded areas 47' and 49', this area 12' representing a cross section of the laser beam 12 which is being generated in that filament.

Since the two ultrasonic waves are assumed to be progressing respectively to the right and downwardly as viewed in FIG. 4, the resultant motion of the laser beam 12 will be downwardly and to the right along a diagonal line as indicated by the arrow 50 in FIG. 4. During each succeeding cycle of the scanning action the phase relationship of the ultrasonic waves can be progressively altered by introducing a predetermined time delay so that the diagonal scanning path is progressively shifted across the end face of the crystal 40. Thus, a series of diagonal scans are performed to achieve complete scanning of the two-dimensional scanning area.

FIG. 5 is an end view of a crystal assemblage which illustrates another method of achieving a two-dimensional scan utilizing the principles described hereinabove. In this embodiment the active medium comprises a plurality of superimposed crystals 52, 53, 54, 55 and so on, the lateral faces of which are cut and prepared in such a manner as to provide a continuous guide path for an ultrasonic wave that is generated by the transducer 56 positioned adjacent to the first crystal 52. The path through which this ultrasonic wave is guided is indicated by the broken lines and arrows in FIG. 5. As the wave successively traverses the various layers of crystals in the stack, it produces, in effect, a traveling filament exhibiting the birefringent properties necessary for lasing action, this filament appearing on a different vertical level during each of its horizontal passages through the layered medium. Eventually each successive peak of the ultrasonic wave is absorbed by the wave absorber 58 which adjoins the final crystal in the assemblage. The line of stress thus is shifted progressively in two dimensions through the stack of crystals 52, 53 and so forth, thereby conditioning the medium for the emission of a laser beam which will scan successive rows of the rectangular scanning area defined by the crystal assembly.

Ultrasonic waves have been disclosed herein as the agencies utilized for producing the desired scanning action, because they lend themselves conveniently to this purpose. It should be understood, however, that any other agency which will produce suitable optical effects within the active medium may be employed without departing from the spirit of the invention.

Although the above description makes reference to a ruby crystal as an exemplary medium for generating a laser beam, other suitable media are available for this purpose. It is possible, for example, to utilize a glass rod doped with neodymium as the active medium. Such a material normally is not birefringent. However, if it is desired that the medium have a preferred direction of oscillation, this can be achieved by providing the glass rod with suitable Brewster angle windows at its ends so that light emitted therefrom normally has a given polarization. By suitably stressing the neodymium-glass rod in the manner proposed hereinabove, it can be rendered birefringent along a selected stress line so that lasing action is permitted only in this filament of the rod wherein the polarization of the light has undergone the necessary change.

While the invention has been particularly shown and described with reference to several preferred embodiments thereof, it will be understood by those skilled in the art that the foregoing and other changes in form and details may be made therein without departing from the spirit and scope of the invention.

What is claimed is:

1. Apparatus for generating a scanning light beam comprising
  a laser having
    reflecting means affording two spaced light reflecting surfaces, each of which is capable of reflecting at least part of the light coming from the other of said surfaces, and
    an active laser medium disposed between said light reflecting surfaces and responsive to pumping energy for generating light which can be reflected by said surfaces,
  polarized analyzing means disposed between said laser medium and at least one of said light reflecting surfaces whereby the transmission of light between said medium and said reflecting means through said analyzing means is substantially limited to light having a polarization consistent with that of said analyzing means,
  said medium normally being in a first optical state such that the generated light which passes from at least one of said reflecting surfaces through said medium is polarized in a manner that substantially prevents the passage of such light through said analyzing means to the other of said reflecting surfaces, said medium also being capable, when suitably stressed, of assuming a second optical state such that the generated light which passes through said medium between said reflecting surfaces is polarized in a manner consistent with that of said analyzing means, and
  stress wave generating means for propagating a stress wave through said laser medium to place said medium in its second optical state wherever said medium is suitably stressed by said wave, thereby to enable the generation of a light beam at least partially reflected by both of said surfaces through that filament of said medium which at each instant is in said second optical state.

2. Apparatus for producing a scanning light beam comprising
  laser means having a birefringent active medium disposed between spaced parallel surfaces which are at least partially light reflecting, said medium normally being in an optical state such that light emitted therefrom toward said reflecting surfaces tends to be polarized in a particular direction,
  a source of pumping energy for said laser means,
  polarized analyzing means disposed between said medium and one of said light reflecting surfaces to block the passage of light polarized in said particular direction, thereby to prevent lasing action of said medium in its normal state, and
  wave generating means associated with said laser means for propagating a stress wave through said medium in a direction substantially parallel to said reflecting surfaces to alter the birefringent properties of that portion of said medium which at each instant is being stressed by said wave, whereby light having a polarization such that it is passed by said analyzing means is emitted by said medium at a position therein which varies according to the progress of said wave through said medium.

3. Apparatus as set forth in claim 2 wherein said laser medium comprises a birefringent crystal having an optical axis inclined to said light reflecting surfaces.

4. Apparatus for producing a scanning light beam comprising
  laser means having an active medium disposed between spaced parallel surfaces which are at least partially light reflecting, said medium normally exhibiting substantially no birefringent properties with respect to light rays passing through said medium to or from either of said reflecting surfaces,
  a source of pumping energy for said laser means,
  first analyzing means disposed between said medium and one of said reflecting surfaces to block the passage of light other than that which is polarized in a first direction,
  second analyzing means disposed between said medium and the other of said reflecting surfaces to block the passage of light other than that which is polarized in a second direction at right angles to said first direction, thereby to prevent lasing action of said medium in its normal state, and
  wave generating means associated with said laser means for propagating a stress wave through said medium in a direction substantially parallel to said reflecting surfaces,
  said medium being stress-sensitive whereby the filamentary portion of said medium which at each instant is under the stress of said wave assumes a birefringent state which causes a quadrature shift in the polarization of light passing through such filament between said first and second analyzing means, thereby enabling said medium to generate a laser beam having a position that varies with the progress of said wave through said medium.

5. Apparatus as set forth in claim 4 wherein said laser medium comprises an anisotropic crystal having an optical axis extending substantially perpendicular to said reflecting surfaces.

6. Apparatus for generating a scanning light beam comprising
  a laser having
    reflecting means affording two spaced light reflecting surfaces, each of which is capable of reflecting at least part of the light coming from the other of said surfaces, and
    an active laser medium disposed between said light reflecting surfaces and responsive to pumping energy for generating light which can be reflected by said surfaces,
  polarized analyzing means disposed between said laser medium and one of said light reflecting surfaces whereby the transmission of light between said medium and said one reflecting surface is substantially limited to light having a polarization consistent with that of said analyzing means,
  said medium normally being in a first optical state such that the generated light which passes through said medium is polarized in a manner that substantially prevents its passage through said analyzing means, said medium also being capable, when suitably stressed, of assuming a second optical state such that the generated light which passes through said medium is polarized in a manner which enables it to pass through said analyzing means, and stress wave generating means for propagating a stress wave through said laser medium to place said medium in its second optical state wherever said medium is suitably stressed by said wave, thereby to enable the generation of a light beam at least partially reflected by both of said surfaces through that filament of said medium which at each instant is in said second optical state.

7. Apparatus as set forth in claim 6 wherein said laser medium is an anisotropic crystal having an optical axis inclined to said light reflecting surfaces.

8. Apparatus for generating a scanning light beam comprising
 a laser having
  reflecting means affording two spaced light reflecting surfaces, each of which is capable of reflecting at least part of the light coming from the other of said surfaces, and
  an active laser medium disposed between said light reflecting surfaces and responsive to pumping energy for generating light which can be reflected by said surfaces,
 polarized analyzing devices respectively interposed between said laser medium and said light reflecting surfaces whereby the transmission of light between said medium and each of said reflecting surfaces is substantially limited to light having a polarization consistent with that of the interposed analyzing device, said devices respectively being polarized in orthogonally related directions,
 said medium normally being in a first optical state such that the generated light which passes through said medium toward either of said reflecting surfaces undergoes no change of polarization during its passage through said medium, said medium also being capable, when suitably stressed, of assuming a particular birefringent state such that light of a given frequency which passes through said medium undergoes a quadrature shift of polarization during such passage, and
 stress wave generating means for propagating a stress wave through said laser medium to place said medium in said birefringent state wherever said medium is suitably stressed by said wave, thereby to enable the generation of a light beam by that filament of said medium which at each instant is in said birefringent state.

9. Apparatus as set forth in claim 8 wherein said laser medium is an anisotropic crystal having an optical axis disposed perpendicular to said reflecting surfaces.

10. Apparatus for generating a light beam to scan a two-dimensional area comprising
 a laser having an active body of stress-optic material disposed between light reflecting surfaces on one of its axes, the dimensions of said body along its other two axes being commensurate with those of the area to be scanned,
 polarized light analyzing means interposed between said active laser body and at least one of said light reflecting surfaces to prevent lasing action when the polarization of the light generated within said body is not consistent with that of said analyzing means,
 stress-producing devices associated with said laser for respectively transmitting stress waves through said body along said other two axes in order to condition the portion of said body which is being stressed at the intersection of said waves for generating light having a polarization consistent with that of said analyzing means, and
 a source of pumping energy for said laser.

11. Apparatus for generating a light beam to scan a two-dimensional area comprising
 a laser having an active body of stress-optic material disposed between light reflecting surfaces on one of its axes, the dimensions of said body along its other two axes being commensurate with those of the area to be scanned,
 polarized light analyzing means interposed between said active laser body and at least one of said light reflecting surfaces to prevent lasing action when the polarization of the light generated within said body is not consistent with that of said analyzing means,
 wave generating means for introducing into said body at an initial position therein a stress wave that is propagated through a first layer of said material in a direction paralleling one of said other two axes, the portion of said body which is stressed by said wave being capable of assuming an optical state wherein it can generate light having a polarization consistent with that of said analyzing means,
 said body having appropriately angled outer faces for directing said stress wave back and forth through succeeding layers of said body toward a final exit position, whereby said laser body is conditioned for generating a light beam having a position that varies in two dimensions with the progress of said wave through the respective layers of said body defined by said outer faces, and
 a source of pumping energy for said laser.

References Cited

UNITED STATES PATENTS

| | | | |
|---|---|---|---|
| 3,111,666 | 11/1963 | Wilmotte | 350—149 X |
| 3,245,002 | 4/1966 | Hall | 331—94.5 |
| 3,330,957 | 7/1967 | Runnels | 350—149 X |
| 3,339,151 | 8/1967 | Smith | 350—160 X |
| 3,344,365 | 9/1967 | Lewis | 350—160 X |

DAVID SHONBERG, Primary Examiner.

PAUL R. MILLER, Assistant Examiner.

U.S. Cl. X.R.

331—94.5; 350—150, 157, 160, 161